E. T. BANES.
SIGNALING SYSTEM FOR AUTOMOBILES OR THE LIKE.
APPLICATION FILED JULY 14, 1914.
1,156,453.
Patented Oct. 12, 1915.
2 SHEETS—SHEET 1.
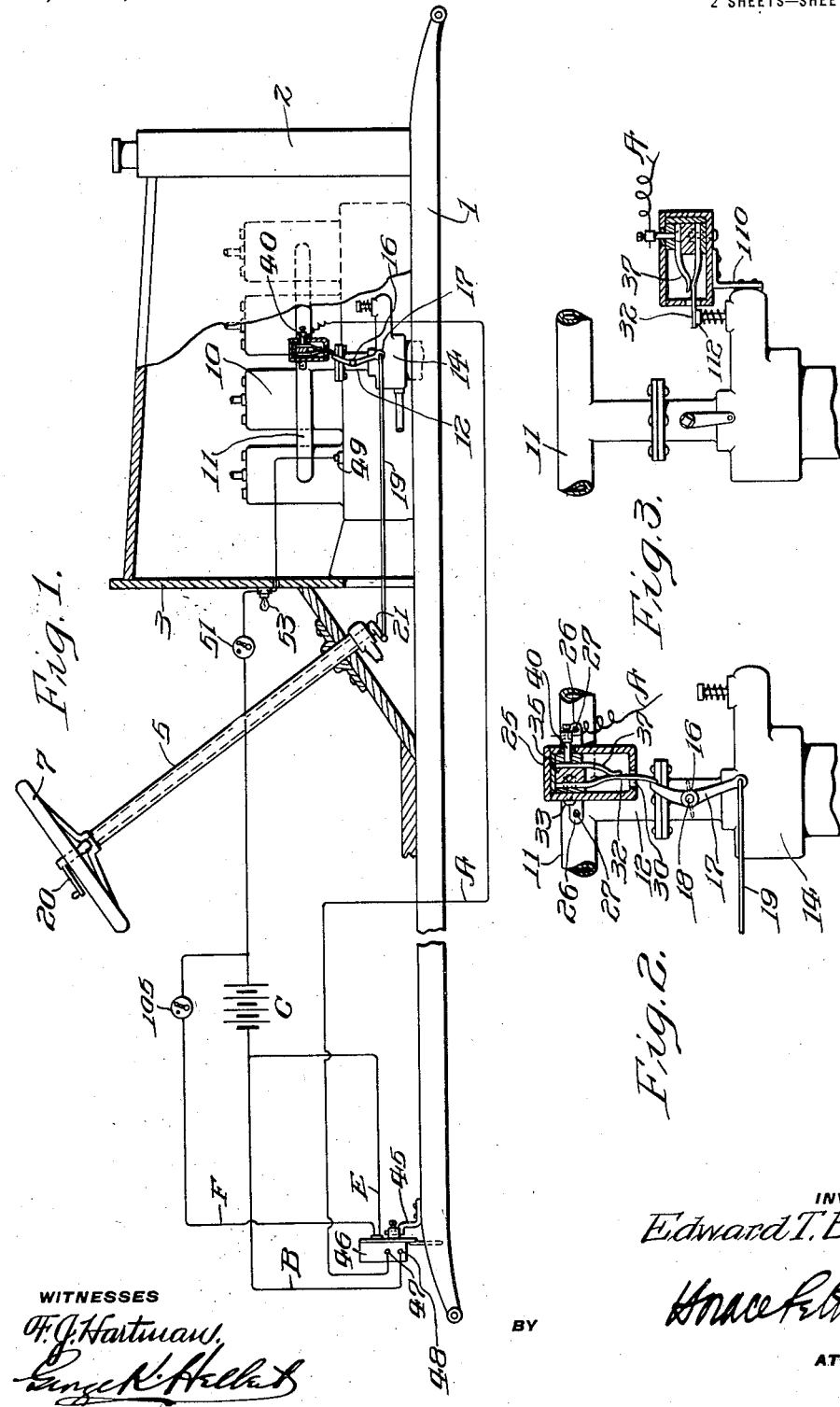
WITNESSES
INVENTOR
Edward T. Banes.
BY
ATTORNEY

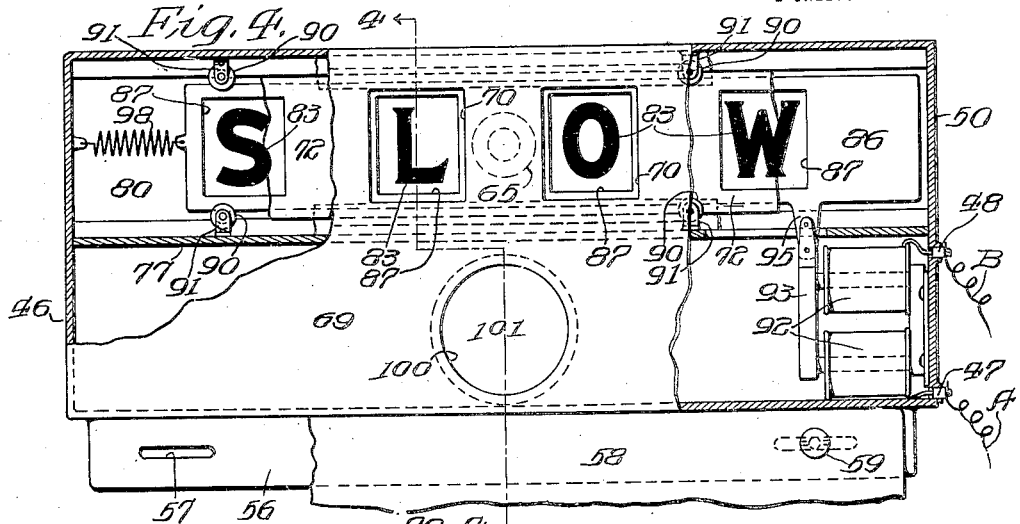

UNITED STATES PATENT OFFICE.

EDWARD T. BANES, OF OGONTZ, PENNSYLVANIA.

SIGNALING SYSTEM FOR AUTOMOBILES OR THE LIKE.

1,156,453.  Specification of Letters Patent.  Patented Oct. 12, 1915.

Application filed July 14, 1914. Serial No. 850,856.

*To all whom it may concern:*

Be it known that I, EDWARD T. BANES, a citizen of the United States, and a resident of Ogontz, in the county of Montgomery and State of Pennsylvania, have invented certain new and useful Improvements in Signaling Systems for Automobiles or the like, of which the following is a specification, reference being had to the accompanying drawings.

Among the principal objects of my invention are to provide an improved signaling system for the purpose of giving notice to an overtaking automobile of the slowing up of the preceding automobile, which system shall be absolutely automatic in operation and which shall not require the attention of the driver; to provide such a system which shall be of a nature to be readily attachable to existing automobiles as well as to be readily applied to new automobiles during the process of manufacture, and to provide such a system which shall be electrically controlled; which shall contain but few moving parts; which shall be simple in construction; which shall require a minimum consumption of current, and which shall have an extremely simple method of electrical wiring.

Further objects of my invention are to provide an improved electrically operated rear signal which will indicate to an overtaking automobile both in the daylight and at night time, any material lessening of the speed of a preceding automobile which shall consist of but few parts; which shall be simple and cheap to construct and not liable to get out of order; and which shall present a neat and pleasing appearance when in position upon an automobile, and which shall also serve as a permanent tail light as well as a license tag holder.

Further objects of my invention are to provide a circuit breaker of improved design which may be operated in the vicinity of the carbureter of an automobile without danger of fire, and which, in connection with certain parts of the speed controlling means of the motor, will automatically make and break the circuit of the signaling system as the speed of the automobile is varied.

My invention further includes all of the other various novel features of construction and arrangement hereinafter more definitely specified and described.

In the accompanying drawings Figure 1 is a substantially diagrammatic side elevational view of the frame and motor of an automobile showing my improved signaling system installed thereon; Fig. 2 is an enlarged side elevation, partially in vertical section, of certain details of the system, and Fig. 3 is a similar view illustrating corresponding details of a slightly modified form thereof; Fig. 4 is a front elevation, partially in section, of the rear signal removed from the automobile; Fig. 5 a transverse vertical section thereof taken on the line 4—4; and Fig. 6 is a view similar to Fig. 4 of a slightly modified form of rear signal.

I shall first describe the system complete as installed upon an automobile as diagrammatically shown in Fig. 1, and shall then more particularly describe the various parts and details thereof. Referring therefore for the moment principally to Fig. 1, the same shows an automobile frame 1 having mounted thereon the usual radiator 2, dashboard 3 and steering column 5, at the upper end of which is located the usual steering wheel 7. The motor 10, or other source of power which may be of any preferred type provided with an intake manifold 11, and an intake pipe 12 is located upon the frame in the usual manner, and attached to the lower end of the intake pipe is the carbureter 14, which may be of any usual or preferred construction and which is provided with the accelerator valve 16, operated by means of the lever 17 serving to rotate the stem 18 to which the valve 16 is attached, push rod 19 and accelerator 20, the latter being suitably connected through the steering column 5 to the rear of the push rod 19, by means of the bell crank 21, or other suitable connections.

A circuit breaker comprising a box 25 may be attached in any preferable or desired manner to any convenient portion of the motor, or other convenient point in the vicinity of the carbureter, its location being conveniently arranged to permit of its performing its proper functions as hereinafter described, and in the drawing, in Figs. 1 and 2 it is shown as attached by means of a strap 26 and screws 27 to the intake manifold 11, the strap being suitably secured to the rear of the box. It will, of course, be understood that the box is provided with a suitable preferably removable cover, so as to completely inclose its interior mechanism, said cover not being shown in the drawings for the sake of clearness. A small opening 30 is preferably provided in one end of the box through which projects the contact spring 32, the inner end of which is secured within the box as by the bolt 33, and suitably electrically insulated from the walls of the box by means of fiber or other insulating means 35. Completely within the box and also insulated from its walls, may be located an auxiliary spring 37, which, however, is electrically connected with the binding post 40, projecting through the wall of the box, which binding post may also, as shown, serve the purpose of securing or assisting in securing the auxiliary spring within the box. The contact spring 32, and the auxiliary spring 37 may preferably be formed in such manner that they converge toward their outer ends so that normally the point of the auxiliary spring is adjacent to but not in contact with, the contact spring, the end of which, as has hitherto been stated, extends outside of the box 25 through the opening 30.

The lever 17 controlling the accelerator valve 16 may preferably be extended somewhat beyond the stem 18 and the breaker box positioned upon the motor in such manner that the contact spring 32 will contact with the lever when the latter is in position to close or nearly close the valve 16, as clearly shown in Fig. 2, the relation of the parts being such that when the lever 17 assumes the position described, the contact spring 32 will be sufficiently depressed from its normal position to contact with the auxiliary spring 37 to form an electrical contact between the two springs.

Suitably located upon the frame 1 or other portion of the automobile, may be positioned the bracket 45 supporting the signal 46, hereinafter more particularly described, having the binding posts 47 and 48. From the former a wire A extends to the binding post 40 upon the breaker box, and from the latter another wire B extends through a source of current C, and is suitably grounded upon the motor as at 49, which is in electrical connection with the lever 17. If desired, a switch 51 and telltale light 53 may be connected in series in the circuit. It will thus be evident that the circuit will be completed by the contact of the contact spring 32 with the auxiliary spring 37, due to the movement of the lever 17 upon the closing, or substantial closing, of the accelerator valve 16, thereby permitting a flow of current through the circuit for the purpose of operating the signal as hereinafter described.

Referring now more especially to Figs. 4 and 5, I shall proceed to describe the signal 46, which may preferably consist of an outer casing 50, formed of sheet metal or other suitable material and provided upon its back 51 with a suitable support 52 adapted to receive the end of the bracket 45, and to be secured thereto by means of a set screw 53. The back of the casing 50 may also preferably be continued downwardly beyond the bottom of the casing as at 56, and provided with suitable openings 57 for the attachment of a license tag 58, by means of bolts 59 and lock nuts 60, the bottom of the casing being preferably provided with a longitudinal slot 62 to enable the light generated within the casing by a small electric lamp 65, suitably secured therein, to shine upon and illuminate the tag.

Preferably adjacent the upper part of the casing and in the front 69 thereof, may be provided a plurality of small, preferably substantially rectangular, openings 70, the number of these openings being generally regulated by the number of letters to be exposed when the signal is in operation as hereinafter described, four of such openings being shown in the drawings, the said openings being closed by a strip of plain glass 72 secured upon the inside of the casing in any suitable manner. An advantageous means of holding the glass in position, although any other suitable means may be employed, is to secure strips of metal 73 and 74 upon the inside of the casing as by soldering or riveting, the strips of metal being formed with a longitudinal off-set to form a groove for the reception of the edges of the glass 70, the joint between the glass and the casing being made as tight as possible to exclude dust and moisture from the interior of the casing.

Extending rearwardly in the interior of the casing and preferably suitably secured as by brazing or soldering to the front wall thereof, is a longitudinal bracket 77, provided at its extremity with suitable upturned portions to form a groove 78 for the reception of the lower edge of another glass 80, a similar groove 82 for the reception of its upper edge being formed upon the under side of the top of the casing, as clearly shown in Fig. 5. Upon the glass 80 may preferably be painted or otherwise displayed the letters 83 and in practice it is desirable to either make the glass dark in color and the letters of a light contrasting color, or else to make the glass of a light color, for instance by using ground glass, and the letters either black or substantially so, in order that they may be readily observed against the background of the glass in the day time. Between the glasses 72 and 80 may preferably be located the sliding shutter 86, which may be formed of aluminum or other suitable material, and provided with a plurality of openings 87 corresponding in number to the openings 70 in the exterior of the casing, the shutter being preferably arranged to slide longitudinally of the casing upon small rollers 90 suitably mounted in brackets 91 secured to the bracket 77 and to the under side of the top of the casing.

Preferably adjacent one end of the casing and suitably secured thereto may be located a solenoid or electro-magnet 92, its armature 93 being fixedly connected either directly to the shutter 86 or to a depending portion thereof 95, as shown in Fig. 4, the windings of the solenoid being connected to suitable binding posts 47 and 48 hitherto referred to, said binding posts extending through the end of the casing. A spring 98 of a strength somewhat less than the pull exerted by the solenoid upon its armature when energized may preferably be connected to that end of the shutter 86 farthest from the solenoid 92, the other end of the spring being suitably secured to the interior of the casing.

Beneath the bracket 77 and preferably substantially equidistant from the ends of the casing, the front thereof may be provided with a suitable opening 100 covered by a red or other colored glass 101 through which the rays of the lamp 65 will continuously shine when the latter is lighted for the purpose of acting as a permanent tail light for the automobile, the miniature lamp 65, which is suitably secured within the casing, being connected with a source of electricity C by means of the circuit E F, in which circuit a switch 105 may be interposed for the purpose of controlling the same as may be desired.

The operation of the system is as follows: The parts being secured in position upon the automobile and the switch 51 being closed, it will be evident that so long as the accelerator 20 remains in its closed, or substantially closed position, the lever 17 will force the contact spring 32 into electrical contact with the auxiliary spring 37, thereby completing the circuit A B through the solenoid 92, which, being thus energized, will draw the armature 93 toward the right in Fig. 4, and with it the shutter 86 exposing through the openings therein the letters 83 upon the contrasting glass 80, and thus indicating in the daytime to an overtaking automobile that the speed of the overtaken automobile is reduced. Similarly, at night, when the lamp 65 is lighted, the rays of light will shine through the glass 80 and thus outline the contrasting letters thereon, or else will shine through the letters and brightly illuminate them if they have been formed upon a dark glass background. The moment, however, that the accelerator is opened to increase the speed of the automobile, the movement of the lever 17 will permit the contact spring 32 to assume its normal or substantially normal position out of contact with the auxiliary spring 37, thereby interrupting the circuit A B, deënergizing the solenoid 92 and permitting the spring 98 to draw the shutter 86 toward the left to a position to cover the letters 83, so that they cannot be observed. It will thus be seen that the operation of the system is entirely automatic, depending upon the movement of the accelerator and its attendant parts as the motor is slowed down or speeded up, and furthermore, since the contact between the auxiliary spring and contact spring takes place within the breaker box 25, there is no danger that any sparking which may occur between the springs when the contact is made or broken will serve to ignite any of the gasolene or gasolene mixture which may be present in the vicinity of the carbureter, whereby all danger of accidental fire is obviated.

In Fig. 3 is shown a slightly different means of locating the breaker box, the box in this instance being connected to the carbureter or other part of the motor as by the bracket 110, in such manner that the contact spring 32 shall be operated by the movement of the stem 112 of the auxiliary air valve of the carbureter, which, as is well known, is adapted to move when the speed of the motor is varied. In Fig. 3 the breaker box is shown as arranged upon a carbureter in which the auxiliary air valve stem is depressed when the motor is speeded up, and in which it rises when the motor is slowed down, so that toward the limit of its upward movement it engages the contact spring 32 and carries the latter upward with it to engage the auxiliary spring 37 in the manner hereinbefore described.

In Fig. 6 is shown a slightly modified form of the signal in which a small motor 120 is substituted for the solenoid or magnet 92, the shaft of the motor being provided with a small-toothed wheel 122 suitable for engagement with a rack 124 formed upon the lower edge of the shutter 86, whereby when the motor is rotated in the direction of the arrow by the flow of current through the circuit A B the shutter will be drawn toward the right, the spring 98 serving to move the shutter in the opposite direction when the circuit is broken by the speeding up of the vehicle motor.

I have considered it advisable in view of the numerous types of automobiles and like vehicles now in use, in many of which considerable difference exists in the form and relation of the various parts, to illustrate the installation of the system somewhat diagrammatically, and in order to adapt it to use upon all types of automobiles and the like under different conditions and in varying situations, it will be evident that various changes may be made in the form of the different parts of the device, and in their relative location, as well as in the method of wiring employed, without departing from the spirit and scope of the invention as defined in the appended claims.

Having thus described my invention, I claim and desire to protect by Letters Patent of the United States:

1. The combination in a rear signaling system for automobiles or the like, of an internal combustion motor having an intake pipe, means for closing said intake pipe, a rear signal, a source of electrical energy, an electric circuit including said rear signal and said source of electrical energy, and means adjacent said intake pipe operative through the movement of said closing means to make and break said circuit as said intake pipe is closed or opened.

2. The combination in a rear signaling system for automobiles or the like, of an internal combustion motor having an intake pipe, means for closing said intake pipe, an electrically operated rear signal, a source of electrical energy, an electric circuit including said signal and said source of energy, and means adjacent said intake pipe and comprising a pair of substantially inclosed converging springs operative by the movement of said closing means to make and break said circuit as said intake pipe is closed or opened.

3. The combination in a rear signaling system for automobiles or the like, of a rear signal, a source of electrical energy, an electric circuit including said signal and said source of energy, an internal combustion motor, a carbureter having an auxiliary air valve, and means comprising a plurality of movable springs adjacent said air valve operative by the movement of said valve to make and break said circuit as the speed of said motor is varied.

4. The combination in a rear signaling system for automombiles or the like, of a rear signal, an internal combustion motor, a carbureter having an auxiliary air valve, an electric circuit including said rear signal and a source of electrical energy, and means operative by the motion of said auxiliary air valve to make and break said circuit as the speed of said motor is varied.

In witness whereof I have hereunto set my hand this 8th day of July, A. D. 1914.

EDWARD T. BANES.

Witnesses:
 Lewis T. Stevens,
 Sadie Brown.